Oct. 7, 1952     M. L. WILLIAMS     2,612,826
SWIVEL HITCH FOR EARTHWORKING IMPLEMENTS
Filed Sept. 27, 1948
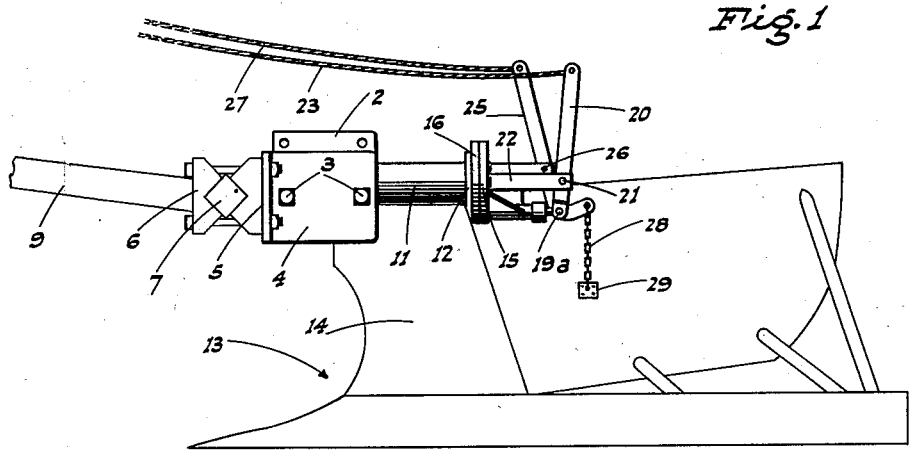
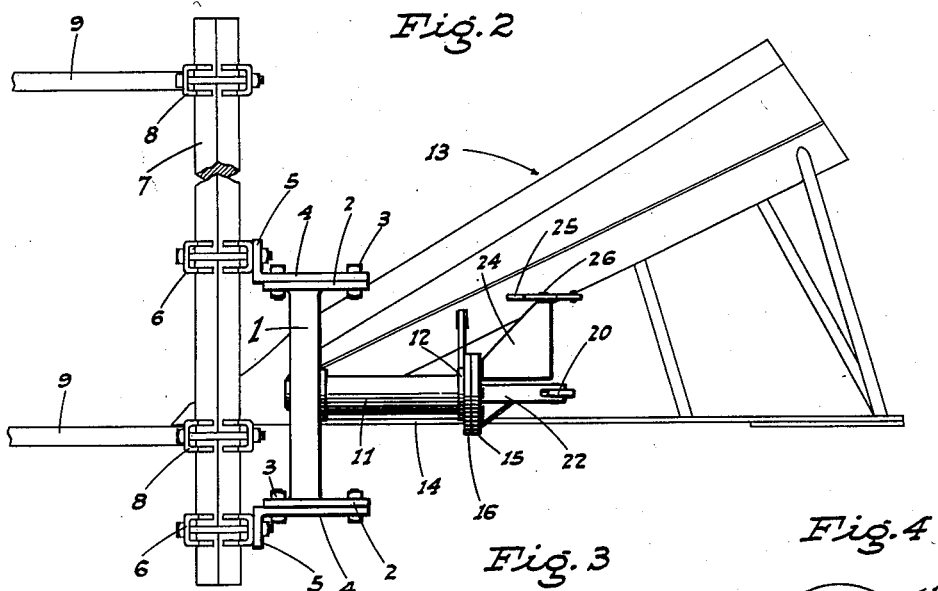
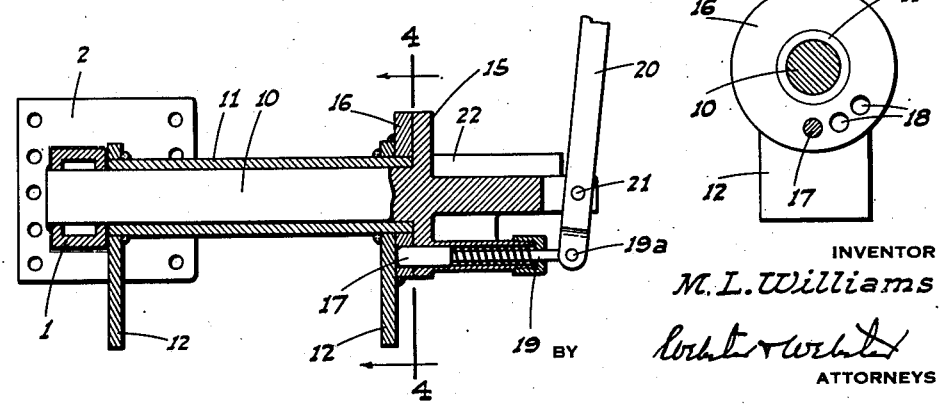
INVENTOR
M. L. Williams
BY
ATTORNEYS Patented Oct. 7, 1952

2,612,826

UNITED STATES PATENT OFFICE 2,612,826

SWIVEL HITCH FOR EARTHWORKING IMPLEMENTS

Marvin L. Williams, Tulare, Calif.

Application September 27, 1948, Serial No. 51,397

3 Claims. (Cl. 97—47).

This invention is directed to, and it is one object to provide, a novel swivel hitch for connecting an earth working implement to the tool bar of a tractor or wheeled carrier; the hitch mounting the implement for selective rotative adjustment about a longitudinal axis, whereby the implement can be maintained in a desired working position (for example, level transversely of the direction of travel), regardless of the lateral tilt of the tractor or carrier.

Another object of the invention is to provide a swivel hitch designed particularly, but not limited, for use with a ditching plow.

A further object of the invention is to provide a swivel hitch arranged so that the selective rotative adjustment of the implement can be accomplished by the operator from his seat on the tractor.

An additional object of the invention is to provide a swivel hitch which is rugged but simple in structure, being designed for ease and economy of manufacture.

It is also an object of the invention to provide a hitch, for the purpose described, which is practical and reliable in use, and exceedingly effective for the purpose for which it is designed.

These objects are accomplished by means of such structure and relative arrangement of parts as will fully appear by a perusal of the following specification and claims.

In the drawings:

Fig. 1 is a side elevation of the hitch in use.

Fig. 2 is a plan view of the same.

Fig. 3 is an enlarged sectional elevation of the hitch.

Fig. 4 is a cross section on line 4—4 of Fig. 3.

Referring now more particularly to the characters of reference on the drawings, the novel swivel hitch comprises a cross bar 1 affixed, at its ends, to transverse attachment plates 2. The transverse attachment plates 2 are vertically adjustably secured by bolts 3 to complementary attachment plates 4; the latter having outturned flanges 5 on their leading or forward edges.

The flanges 5 are secured by adjustable clamps 6 to a transverse tool bar 7, and said tool bar is mounted by adjustable clamps 8 in connection with the rear ends of the power lift arms 9 of a tractor, or wheel-type tool carrier.

It will be recognized that upon up or down motion of the power lift arms 9, there will be a corresponding motion imparted to the cross bar 1 for the purpose of vertical adjustment of the hitch.

A heavy-duty spindle 10 is fixed, at its forward end, in connection with, and thence projects rearwardly from, the cross bar 1 in a normally generally horizontal position.

A rotary sleeve 11 surrounds the spindle 10, and said sleeve includes depending brackets 12 by means of which an earth working implement may be attached to said sleeve 11 in fixed, suspended relation.

In the present embodiment the earth working implement is a ditching plow, indicated generally at 13, which includes a front standard assembly 14 by means of which said plow is secured to the depending brackets 12 in any suitable and rigid manner.

The rotary sleeve 11 is prevented from relative axial displacement by engagement of said sleeve at its forward end with the cross bar 1, and engagement of said sleeve at its rear end with a fixed index disc 15 on the spindle 10.

The adjacent end of the sleeve 11 carries a rotary index disc 16; the discs 15 and 16 running in face to face engagement.

In order to releasably lock the rotary sleeve 11 in selective positions of adjustment, the fixed index disc 15 is provided with a spring-pressed locking pin 17, which extends through said disc from the back side parallel to its axis, and engages in a selected one of an arcuate row of holes 18 in the rotary index disc 16 concentric to its axis. The pin 17 includes a rearwardly extending stem 19 which is pivoted, as at 19a, to the lower end of an upstanding, manually operative lever 20; the latter being pivoted, intermediate its ends, as at 21, to a rearwardly projecting extension 22 of the spindle 10.

A pull cord 23 leads forwardly from the upper end of the lever 20; such pull cord being accessible to the tractor operator from his seat.

With the above described swivel hitch it is possible for the earth working implement 13 to be set in a selected working position. For example, if the tractor or tool carrier is tilted laterally to one side or the other by reason of working conditions, the implement 13 can be adjusted so that it is level transversely of the direction of travel.

The tractor operator need not leave his seat to accomplish the adjustment; it being only necessary that he pull on the cord 23, which results in releasing of the pin 17. As the implement 13 is heavy towards one side it will then rotate of itself to the selected position, at which time the pin 17 is released to fall into one of the holes 18.

With earth working implements which thus tend to rotate in one direction, the following mechanism is provided so that the operator can cause contra-rotation or adjustment from his seat on the tractor; such mechanism comprising:

The rearwardly projecting extension 22 of the spindle 10 is fitted with a lateral mounting plate 24, and a bellcrank lever 25 is pivoted, as at 26, on said mounting plate for swinging movement about a transverse axis. The upstanding leg of the bellcrank lever 25 is connected to a pull cord 27 which leads forward to the tractor. The other and shorter leg of the bellcrank lever 25 projects rearwardly, and a lift chain 28 depends from such other leg for connection, as at 29, with a part of the implement 13 in laterally offset relation to the axis of the spindle 10.

Thus, by pulling on the cord 27 the bellcrank lever 25 is swung in a direction so that the chain 28 lifts on the implement 13, tending to rotate it in a direction contra to the direction which such implement rotates gravitationally when the pin 17 is released.

With the described swivel hitch the implement 13 can be maintained in any selected relative rotative position with respect to the spindle 10, particularly level transversely of the direction of travel so as to compensate for lateral tractor tilt.

The swivel hitch is of rugged and reliable construction, and serves effectively for the purpose of mounting earth working implements to a tractor or tool carrier for adjustment, as described.

Under certain working conditions it is desirable that the spindle and sleeve assembly of the hitch be adjusted vertically with respect to the transverse tool bar 7. This is accomplished by the relative vertical adjustment of attachment plates 2 and complementary attachment plates 4.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A swivel hitch comprising a cross bar, transverse attachment plates at opposite ends of the cross bar, mounting means adapted to secure the plates in connection with a tool bar, a spindle fixed to the cross bar and projecting longitudinally of the direction of travel, a sleeve turnable about the spindle, said sleeve being adapted to be attached in fixed relation to an earth working implement, and means releasably locking the sleeve in selective positions of relative rotative adjustment; said means comprising an index disc assembly between the spindle and sleeve including a spring pressed pin normally but releasably locking said assembly, the spindle extending beyond the sleeve adjacent said assembly, and a lever pivoted on the extension of the spindle and connected in releasing relation to the pin.

2. In combination with a tool bar adapted to be connected transversely of a tractor and adapted to swing with the tractor about its longitudinal horizontal axis, a horizontally disposed rearwardly projecting spindle fixed to the tool bar, a sleeve turnable on the spindle, depending brackets fixed to the sleeve, a ground working tool mounted on and depending from the brackets, the major portion of the weight of the tool being below and to one side of the longitudinal axis of the sleeve whereby the tool tends to automatically rotate about the sleeve in a downward direction on said side, and locking means between the spindle and sleeve, operable from a point adjacent the driver's seat of a tractor to which the tool may be connected, and effective to releasably lock the sleeve against rotation about the spindle, said last named means comprising a disc fixed to and extending radially of the spindle intermediate its ends, a spring pressed pin movable transversely through the disc, a disc on the sleeve movable in face to face contact with the spindle disc and provided with a plurality of circumferentially disposed holes adapted to move into alinement with the pin upon rotation of the sleeve, a lever pivoted to the rear end of the spindle, the lower free end of the lever bing pivoted to the outer end of the pin and the lever being operable to move the pin rearwardly through the spindle disc, the spring being effective to move the pin into an alined hole in the sleeve disc upon release of the lever, and a pull cord connected to the upper end of the lever and adapted to extend to a point adjacent the seat of a tractor to which the tool may be connected.

3. A combination as in claim 2 including a bell crank lever pivoted in connection with the spindle in laterally spaced relation with respect to the longitudinal axis thereof and above the tool, a flexible connection between the bell crank lever and the tool, such bell crank lever being operative to swing the tool about the spindle axis upon release of the pin from the holes in the sleeve disc, and a pull cord connected with the bell crank lever and adapted to extend to a point adjacent the seat of a tractor to which the tool may be connected.

MARVIN L. WILLIAMS.

REFERENCES CITED

The following references are of record in the file of this patent:

UNITED STATES PATENTS

| Number | Name | Date |
|---|---|---|
| 332,302 | Strait | Dec. 15, 1885 |
| 471,915 | Turner | Mar. 29, 1892 |
| 667,515 | Gabel | Feb. 5, 1901 |
| 1,251,096 | Paul | Dec. 25, 1917 |
| 1,447,273 | Bass | Mar. 6, 1923 |
| 1,526,972 | Ferguson | Feb. 17, 1925 |
| 2,429,463 | Hurlimann | Oct. 21, 1947 |
| 2,579,651 | Coviello | Dec. 25, 1951 |

FOREIGN PATENTS

| Number | Country | Date |
|---|---|---|
| 123,866 | Switzerland | Dec. 16, 1927 |